United States Patent [19]

Gravisse

[11] 4,208,300
[45] Jun. 17, 1980

[54] PHOTOLUMINESCENT MATERIALS AND METHOD OF MANUFACTURING SAME

[76] Inventor: Philippe E. Gravisse, 9, résidence Boieldieu, 92 Puteaux, France

[21] Appl. No.: 811,617

[22] Filed: Jun. 30, 1977

Related U.S. Application Data

[63] Continuation-in-part of Ser. No. 700,871, Jun. 29, 1976, abandoned, which is a continuation-in-part of Ser. No. 615,578, Sep. 22, 1975, which is a continuation of Ser. No. 378,311, Jul. 11, 1973.

[30] Foreign Application Priority Data

Oct. 15, 1976 [FR] France ............................. 76 31008

[51] Int. Cl.² ..................... C09K 11/02; C09K 11/10
[52] U.S. Cl. ........................... 252/301.33; 252/301.16; 252/301.35; 252/301.36
[58] Field of Search ..................... 252/301.33, 301.16, 252/301.35, 301.36, 301.4 S, 301.6 S

[56] References Cited

U.S. PATENT DOCUMENTS

| 868,779 | 10/1907 | Hammer | 252/301.33 |
| 1,096,644 | 5/1914 | Saubermann | 252/301.33 X |
| 3,518,205 | 6/1970 | Vukasovich | 252/301.21 |

FOREIGN PATENT DOCUMENTS

| 725922 | 10/1942 | Fed. Rep. of Germany | 252/301.33 |
| 616277 | 1/1949 | United Kingdom | 252/301.33 |
| 730555 | 5/1955 | United Kingdom | 252/301.35 |

Primary Examiner—F. C. Edmundson
Attorney, Agent, or Firm—Staas and Halsey

[57] ABSTRACT

The present invention has for its object to eliminate the expense of the installation and maintenance of a continuous lighting system for roadways, staircases, doorways and the like by using the light remanence obtained from a photo-luminescent material covering the obstacles or structures to be lighted. The invention provides a material having permanent physical, mechanical and chemical properties which cannot be changed by rubbing or wear; in the textile field, the material may constitute the fabric fibres or a standard fabric can be coated with the material. The material products are photo-luminescent in their mass and are of the type comprising a synthetic binding agent having a spectral response from the U.V. to close to the I.R., crystalline fillers or charges with a high coefficient of light transmission over the same spectral field and one or more phosphorescent substances, at least one substance absorbing energy from low wavelengths of light and re-emitting this energy at the level of the absorption spectrum of one of the phosphorescent substances, and at least one fluorescent substance selected so as to give a remanent color which can be different from that of the phosphorescent substance.

18 Claims, 4 Drawing Figures

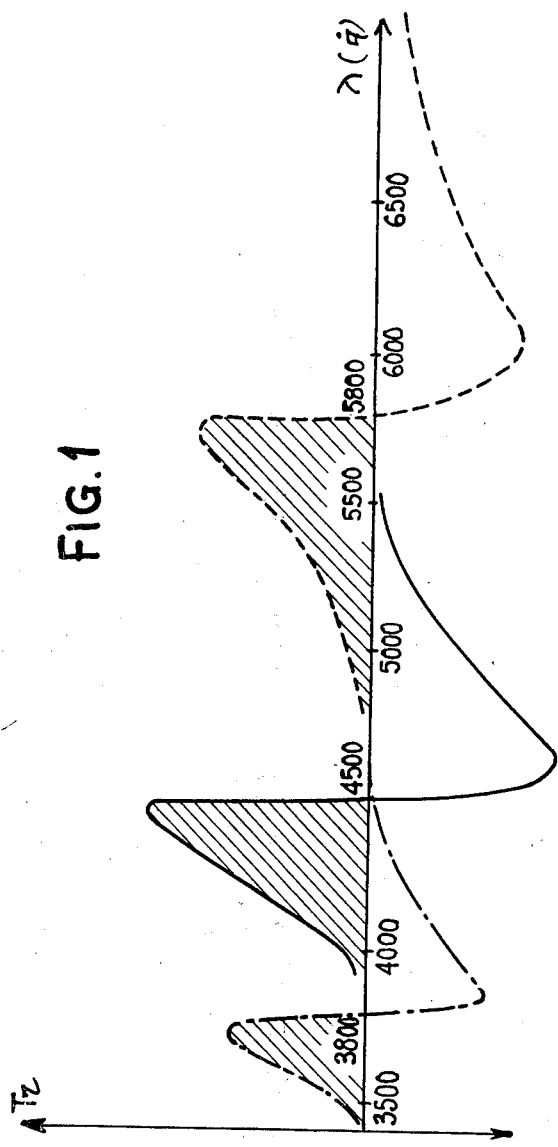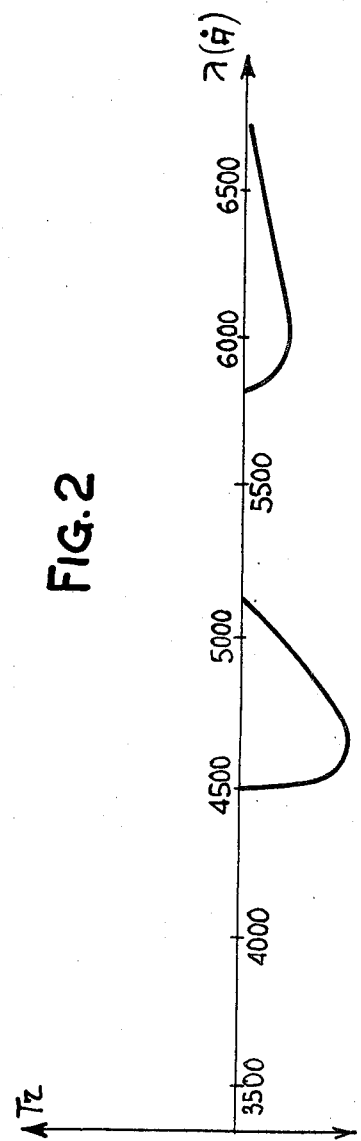

PHOTOLUMINESCENT MATERIALS AND METHOD OF MANUFACTURING SAME

This is a continuation-in-part of application Ser. No. 700,871, filed June 29, 1976, now abandoned; and which is a continuation-in-part of Ser. No. 615,578, Sept. 22, 1975, which is a continuation of Ser. No. 378,311, July 11, 1973.

The present invention relates to improvements made in photo-luminescent products in their mass, and is especially applicable in the constructional or textile industry.

The invention has essentially for its object to provide a safety measure by remedying an absence of lighting, such as that due to the failure of a lighting system, which could give rise to accidents. For example, over a well-lighted portion of a motorway, in which it is thus not necessary to switch-on the head-lamps of vehicles, a sudden failure of the lighting is liable to cause accidents if the line of the road is curved, the lateral safety barriers not then being visible. Similarly, in a staircase, if the light fails abruptly when the automatic time-switch has reached its limit, any person who is going up the stairs is placed in a difficult position.

The invention has also for its object to dispense with the necessity of providing a continuous lighting system, which is always expensive in installation and upkeep costs. On a motorway for example, the light remanence of the infrastructure, covered with a photo-luminescent material according to the invention, as will be explained later, this remanence being due to being swept over by the headlamps of vehicles passing along the roadway, will be sufficient to constitute and illuminate the carriage-way, the area of evolution, the obstacles, the indication of direction of travel, the emergency exit, etc.

In order to prevent accidents or to remedy difficulties, it has already been proposed to use paints having a base of reflecting products, applied on the obstacles or useful parts (roadways, steps of stairs, pillars, doorway entrances) at least so as to follow its contour, and also products having filmy and phosphorescent surfaces for indicating obstacles or showing directions. The defect of these expedients is that the paint becomes worn by rubbing and in consequence it no longer carries out its function after a certain time.

There is also known a material with a base of polyvinyl chloride in which a phosphorescent product has been incorporated. This is utilized for example for application to the buttons of lighting switches for dark corridors or staircases. This material does not possess the necessary stiffness for it to be used as a photo-luminescent material in the sense indicated above.

The invention proposes another and much more interesting solution, in that it provides a material having properties which are permanent, physical, mechanical, chemical, which cannot be changed by rubbing or even by the removal of part of its thickness.

Similarly, in the textile field, it will be possible to obtain fibres constituted by the photo-luminescent material according to the invention or alternatively to coat a conventional fabric with the said material. These fibres or fabrics may also be utilized for safety purposes in particular.

In more precise terms, the said material is constituted in the form of a chemical matrix known per se, the said matrix comprising:

1. A synthetic binder, the spectrum response of which goes from the ultra-violet close to the infra-red, with a maximum coefficient of light transmission, such as for example the acrylic, methacrylic, silicones, or other similar resins.
2. Crystalline charges with a high transmissibility of light over the same spectral field.
3. Phosphorescent substances known per se, such as zinc or cadmium sulphide, strontium sulphide, calcium sulphide or other similar compound (in the case of zinc sulphide for example, the absorption of light takes place between 3800 and 4500 Å and the remanent emission from 4500 to 5200 Å).

It should be noted at this point that in the present description and the accompanying claims, the term "phosphorescent" relates to a phenomenon of photoluminescence the remanence of which is long (equal to or exceeding $10^{-8}$s for example). Similarly, by "florescence" is meant the phenomenon of photo-luminescence with a short remanence (less than $10^{-8}$s for example), photo-luminescence being a phenomenon which thus simultaneously covers phosphorescence and fluorescence.

In known manner and in order to satisfy the requirements of the said material, the crystalline charges are constituted by (or comprise) substances containing silica in a suitable form, such as:

Ground quartz glass,
Ground quartz,
Silica gel,
Silicon anhydride, some of these substances having the form of a colloid which is able to penetrate the ultra-violet.

It is not desirable that the crystalline charge in question should be ground white glass, since such a charge would not be sufficiently transparent to ultra-violet radiation. In fact, the energy contained in ultra-violet radiation is very great and favorable to the production of luminescence, and the advantage of this energy would be lost if ordinary white ground glass were employed.

The present invention consists of incorporating in the above-mentioned chemical matrix, first substances located towards the low wavelengths, and capable of detecting the energy in this zone in order to re-emit it in the absorption zone of the phosphorescent substance, and second substances located in the very long wavelengths, the said second substances having furthermore fluorescent properties.

By way of example, there may be contemplated materials which, apart from the chemical matrix, comprise a substance having at least one aromatic nucleus and a fluorescent substance, permitting:

1. The displacement of the spectral ray of the ultra-violet towards the blue in order to amplify the incident energy (for example by means of anthracene).
2. The re-emission of this incident energy by zinc sulphide for example (or calcium or cadmium sulphide, etc.) in a phosphorescent manner and therefore with a prolonged remanence (greater than $10^{-8}$s).
3. The utilization of a part of this modified energy and of any other incident light (on a nocturnal or diurnal basis) for exciting fluorescent colouring agents which give a coloured quality of these emissions (with a remanence less than $10^{-8}$s).

With a combination in accordance with the invention, it is possible to obtain a more intense daily coloration of the fluorescent coloration agents, for the same concentration, by virtue of the energy absorbed and re-emitted by the said first substances and by the phosphorescent substance. Also there will be present materials which are simultaneously phosphorescent and fluorescent, and the modified colour appropriate to zinc or calcium or cadmium sulphide may be displaced towards the longer wavelengths. In this manner, the daily coloration may be different from the modified night colour.

Other characteristic features and advantages will be more clearly brought out from the description which follows below in respect of the drawings given by way of indication and not in any limitative sense. In these drawings:

FIG. 1 shows diagrammatically the absorption curves (shaded zones) and emission zones (unshaded) of the constituents of a photo-luminescent material according to a first form of embodiment of the invention;

FIG. 2 illustrates diagrammatically the emission spectrum of the material according to FIG. 1, under night conditions;

Referring now to FIG. 1, in which the wavelengths are plotted in abscissae and the coefficient of transmissibility Tr in ordinates, it is found that the photo-luminescent material comprises, in addition to the crystalline charges and the binder, anthracene (spectrum in chain-dotted lines), a phosphorescent substance such as zinc sulphide (spectrum in full lines), and a fluorescent substance (spectrum in broken lines). By virtue of the anthracene, a material of this kind makes it possible to draw energy from the low wavelengths (3000 Å–3800 Å) and to restore it, at least partially in view of the efficiencies of phosphorescence and fluorescence in the long wavelengths (5100 Å–6800 Å) by virtue of the phosphorescent substance and the fluorescent substance.

As will be apparent from FIG. 1, the absorption spectrum of the fluorescent substance overlaps to a large extent the emission spectrum of the phosphorescent substance (zinc sulphide). This amounts to the same thing as saying that there will be practically no remanence of the zinc sulphide, but a fluorescence artificially maintained with a prolonged remanence, by virtue of the energy emitted by the zinc sulphide.

The behaviour of a material of this kind will be as follows:

In the day time, the material will appear orange in this case and with a high intensity, since the fluorescent substance simultaneously absorbs part of the ambient light and also the energy absorbed and emitted by the zinc sulphide and by the anthracene.

By night, the material will also appear to be orange, although more yellow, with a lower intensity than previously, the ambient light component having disappeared, it being understood that the ambient light corresponds to the part of the energy spectrum available by day.

There will be readily understood the advantage of a material of this kind, of which the apparent color is retained by day and also by night, by virtue of photo-luminescent phenomena.

FIG. 2 shows in full lines only the emission spectrum of the material by night. This spectrum brings out a green-yellow remanence, fairly intense, due to the zinc sulphide, and also an orange reflection due to the florescent substance. By reason of the phenomena of photo-luminescence, the material thus appears between the green-yellow and the orange, the colours being cumulative. Although this material is less luminous than that during the day, it can however perfectly well be employed as a photo-luminescent material.

Figure 3:
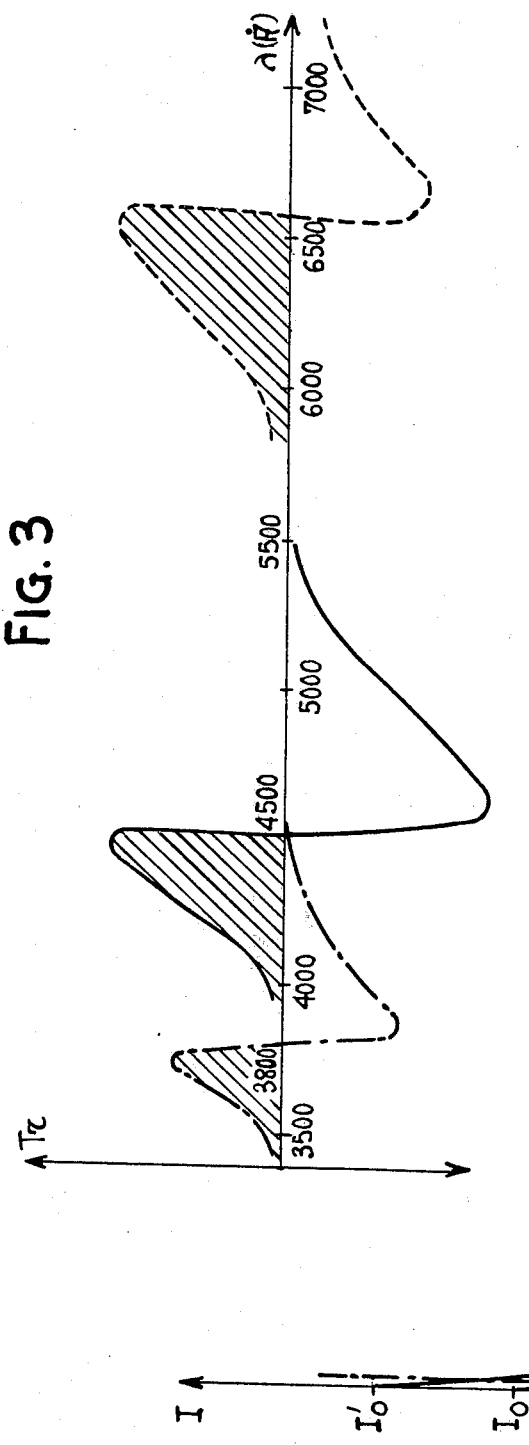
FIG. 3 is similar to FIG. 1, the photo-luminescent material corresponding to a second form of embodiment of the invention.

As shown in FIG. 3, in addition to the spectrum of the anthracene (chain-dotted lines) there are the emission spectra for the phosphorescent substance (in full lines) such as zinc sulphide, and the absorption spectrum for the fluorescent substance (in broken lines) which are disconnected. This amounts to saying that the energy emitted by the zinc sulphide will not be re-absorbed as previously by the fluorescent substance.

It is quite clear that differences appear in the behaviour, depending on whether it is seen:

By day, when the material will appear red by fluorescence, a phenomenon which, in this case, almost completely masks that of the phosphorescence;

by night, when the material will appear green-yellow by phosphorescence, which is then the only active phenomenon.

This material will be more particularly used when different aspects of the material are desired by day and by night, these aspects being due to the phenomena of photo-luminescence.

Whatever diagram may be employed, either FIG. 1 or FIG. 3, it is equally possible to make certain modifications of these basic materials, at the level of the said first substance utilized with the phosphorescent substance. Thus, as has been previously seen, the said first substance which is employed in this case in anthracene with three aromatic nuclei. This substance is particularly valuable because its emission spectrum overlaps the absorption spectrum of the phosphorescent substance (zinc sulphide), thus emitting a transfer of energy from 3000–3800 Å to 4500–5200 Å.

It has been observed that anthracene could be partially replaced by other substances having similar properties.

Particularly advantageous results have been obtained when the above-mentioned replacement substance is naphthalene with two aromatic nuclei.

This gives photoluminescent materials in which the constituents which absorb at shorter wavelengths than the phosphorescent substance consist of naphthalene and anthracene. Two advantages accrue from such a mixture.

A first advantage consists in that the final quantity of energy emitted by the fluorescent substance is increased. This is due to the fact that napthalene has an absorption-emission spectrum which is displaced towards the lower wavelengths with respect to that of anthracene. A certain amount of energy will thus be absorbed by the naphthalene and then re-emitted and absorbed by the anthracene, the remainder of the process being illustrated in FIG. 1 or FIG. 3.

A second advantage consists in that it is possible to reduce the quantity of anthracene employed and this substance is expensive. All other things being equal, the same results of luminosity are obtained when descending to a molar proportion of anthracene of $1 \times 10{-}3$ with respect to the naphthalene, which is much less expensive than anthracene. The quantities of such first substance used being already relatively small, it will readily be understood that in this case, the anthracene is only present in the state of traces.

When the naphthalene and anthracene are used as previously indicated, there is then obtained an absorption-emission spectrum in which the absorption portion corresponds practically to the zone of absorption of the naphthalene spectrum, and in which the emission portion corresponds practically to the emission zone of the anthracene spectrum.

It will of course be understood that the presence of anthracene is rendered necessary by the fact that its emission spectrum overlaps the absorption spectrum of the zinc sulphide, acting as the phosphorescent substance. Depending on the type of phosphorescent substance employed, this anthracene may prove to be useless (phosphorescent substance with an absorption spectrum displaced towards the low wavelengths) or insufficient (displacement of the above mentioned absorption spectrum towards the long wavelengths).

In the first case, the naphthalene may be sufficient and the anthracene will be eliminated, and in the second case it would be necessary to provide, in addition to the anthracene, one or more relay elements having an absorption spectrum corresponding to the emission of the anthracene, and an emission spectrum corresponding to the absorption of the phosphorescent substance. Such relay elements may consist especially of naphthacene (with four aromatic nuclei) and/or of the aromatic compound having five aromatic nuclei.

These elements find their application especially when the zinc sulphide is replaced wholly or partly by cadmium sulphide, this latter emitting in the red when it is pure.

The following table gives the remanence for various mixtures of zinc sulphide and cadmium sulphide (molar proportions).

| ZnS (%) | CdS (%) | Emission colour |
|---------|---------|-----------------|
| 100     | 0       | Green           |
| 80      | 20      | Yellow-green    |
| 60      | 40      | Yellow          |
| 40      | 60      | Orange-yellow   |
| 20      | 80      | Orange-red      |
| 0       | 100     | Red             |

Subsequently, and when it is desired to have a photo-luminescent material emitting orange-red *by night*, there is either added to the phosphorescent substance such as zinc sulphide, a fluorescent substance emitting in this colour, the absorption spectrum of which overlaps the emission spectrum of the phosphorescent substance (see FIG. 1) or alternatively the zinc sulphide is partially replaced by cadmium sulphide (this substance representing for example in this case 70 to 80% of the ZnS-CdS mixture).

This behaviour *by day* will vary depending on whether there is a ZnS-CdS mixture (very intense orange-red remanence), ZnS and a fluorescent substance of the type illustrated in FIG. 1 (intense orange remanence), ZnS and a fluorescent substance of the type illustrated in FIG. 3 (moderately intense orange-yellow remanence). Various fluorescent substances may of course be employed, the choice depending especially on their absorption or emission spectrum (type FIG. 1 or FIG. 3), and on the colour desired.

By way of indication, good results have been obtained by utilizing pigments sold commercially by the Company Marcel QUARRE & Cie, under the name RADGLO.

Three pigments are advantageous for their colour and also for the intensity of their emission peak:

Orange yellow . . . emission peak at 5800 Å
Orange . . . emission peak at 6000 Å
Orange-red . . . emission peak at 6200 Å

Other fluorescent substances have been tried and have offered a certain advantage: these are aromatic substances with five or six aromatic nuclei. It is precisely the five aromatic nuclei substance which is illustrated in FIG. 1. Other substances may be preferred to this, such as α-naphthol or rhodamine B, or compounds of diphenyl-oxazolyl-benzene.

The use of substances containing such aromatic nuclei is particularly useful when homologous substances having a smaller number of nuclei are used to absorb the shorter wavelengths in the presence of the phosphorescent substance. In such a case, aromatic substances having a larger number of aromatic nuclei are used to form doping agents for those having the smaller number of aromatic nuclei.

Two sequences have proved themselves to be good:
Anthracene-ZnS-aromatic substance with five nuclei (case of FIG. 1 with overlapping phosphorescent and fluorescent spectra);
Anthracene-ZnS-aromatic substance with six nuclei (case of FIG. 3 with separate phosphorescent and fluorescent spectra).

Some examples of utilization will now be described, it being understood that these have been given by way of indication and not in any limitative sense.

EXAMPLE 1

This example relates to a photo-luminescent textile obtained by coating by means of the method known as the cylinder doctor.

A typical coating composition is obtained as follows:
(a) 800 grams of ZnS (phosphorescent substance) are dispersed in Tylose 4000 at 3% (2000 g.); this dispersion is carried out at between 30° and 40° C. with agitation.
(b) 2 g of anthracene (the substance which absorbs at shorter wavelengths than zinc sulphide) and 0.03 g of the aromatic substance having five nuclei (the fluorescent substance) are dissolved in 380 g of 2-propanol. Solution is effected by heating to reflux at a temperature below 80° C.
(c) By means of a plunging agitator, 2174 grams of transparent charges (type $SiO_2$) are mixed with the complex resin formed by 1000 grams of acrymil PROTEX, 30 grams of actiron (catalyst) and 120 grams of flexibility agent.
(d) The mixture of solutions (a) and (b) is effected in the vicinity of 40° C. by gradually introducing (b) into (a) under constant stirring, until the homogenization is complete.
(e) The mixture (c) is then added to the solution (d).

EXAMPLE II

The material forming the subject of this example is especially utilized in the building trade, and the method of operation is as follows:
(a) 600 grams of ZnS (phosphorescent substance) is dispersed in Tylose 4000 at 3% (1200 grams). This dispersion is effected at between 30° and 40° C. with agitation.

(b) 4 g of anthracene (the substance which absorbs at shorter wave lengths than zinc sulphide) and 0.06 g of the aromatic substance having five neclei (the fluorescent substance) are dissolved in 760 g of 2-propanol. Solution is effected by heating to reflux at a temperature below 80° C.

(c) 6000 grams of transparent charges (type $SiO_2$) are mixed by means of a stirring device with the complex resin formed by 2000 grams of RODOPAS-AM 054 (Rhone Poulenc), and 32 grams of Texanol.

(d) The mixtures of solutions (a) and (b) is effected in the vicinity of 40° C. by introducing (b) gradually into (a) under constant stirring until complete homogenization is obtained.

(e) The mixture (c) is then added to the solution (d). An identical formula but having no crystalline charges, makes it possible to effect continuous thread dyeing, for example by utilizing a nozzle of the process of the O.P.I. Company or other similar process.

EXAMPLE III

The anthracene of Example II is replaced by a naphthalene-anthracene mixture with a molar ratio of anthracene to naphthalene of 0.01.

The materials obtained in Examples I, II, III all have orange remanent colours.

In the photo-luminescent materials of the present invention, the preferred proportions are as follows:

substances which absorb at shorter wavelengths than the phosphorescent substance: 0.1 to 1% (molar proportion) relative to the synthetic binder.

phosphorescent substance: 1 to 15% (proportion by weight) with respect to the whole (synthetic binder + crystalline charges).

Fluorescent substance: 0.1 to 1% (proportion by weight) with respect to the phosphorescent substance.

Various lighting tests on these materials have been carried out, more particularly as regards the textiles of Example 1. In this latter case, the textile material was illuminated for 20 sec. at 300 lux, and the curve of intensity of remanence as a function of the time was studied.

Figure 4:
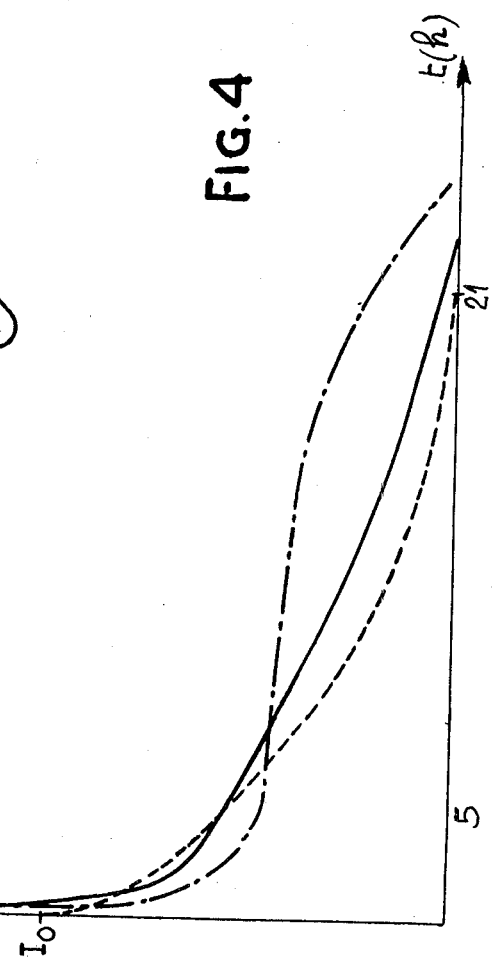
FIG. 4 represents various remanent curves as a function of time.

This curve is shown in full lines in FIG. 4, in which the time in hours is plotted in abscissae, the intensity of remanence being shown in ordinates. By way of comparison, there has been shown in broken lines the curve of a standard photo-luminescent textile, that is to say one lacking the material which absorbs at shorter wavelengths than the phosphorescent substance and the fluorescent substance and in which the photoluminescent material applied to the textile contains only zinc sulphide as a photoluminescent substance and is applied in a film-producing form. Also shown in FIG. 4 is a chainline curve which is a so-called "ideal" curve of the kind which is associated with the discharge of a battery and towards which the solid-line curve should tend.

It is clear from this FIG. 4 that the initial intensity I'o of our curve is definitely higher than that Io of the ZnS curve, and this intensity in full lines remains greater than that of the ZnS for the greater part of the time, mainly in the interval 5h-21h (which normally corresponds to the maximum duration of the remanence of ZnS).

These good results are the consequence of a combination of two factors, namely, firstly a bulk effect from the material, since light is able to penetrate through the material owing to the use of the crystalline fillers, and secondly an energy transfer effect resulting from the overlap between the emission spectrum of the ultra violet absorber(s) and the spectrum of the phosphorescent substance or substances, and possibly from the overlap between the emission spectrum of the phosphorescent substance or substances and of the absorption spectrum of the fluorescent substance or substances.

It has also been found that even better results can be achieved when the product which absorbs at shorter wavelengths than zinc sulphide is diphenyloxazol, which has the same property as anthracene of absorbing light energy in the ultra-violet region and emitting it at a wavelength within the range in which the phosphorescent substance absorbs light such as zinc sulphide.

This compound diphenyloxazol contains two aromatic nuclei and a heterocyclic ring containing oxygen and nitrogen atoms.

A basic formulation (A) can be produced which contains a synthetic binder, crystalline fillers and the remaining requisite ingredients. This basic formulation (A) contains, in parts by weight:

| | |
|---|---|
| Synthetic binder:vinyl acetate-maleic ester copolymer | 200 |
| Zinc sulphide | 54.7 |
| 4% Tylose MH 4000 K | 49.5 |
| Texanol | 3.2 |
| Methanol | 10 |
| Crystalline fillers | 693 |
| | 1010.4 |

The product which absorbs light having the shorter wavelengths is preferably diphenyloxazol (PP0).

The following examples of photoluminescent materials have been produced, the proportions of ultra-violet absorbing and fluorescent materials being expressed in M's (Mole/kg of synthetic binder).

EXAMPLE IV (A) + ultra violet absorber: PPO ($10^{-3}$M)
fluorescent material: Rhodamine B ($8.3.10^{-6}$M)

EXAMPLE V (A) + ultra violet absorber: PPO ($10^{-3}$M)
fluorescent material: Rhodamine B ($1.25.10^{-5}$M)

EXAMPLE VI (A) + ultra violet absorber: PPO ($10^{-3}$M)
fluorescent material: Rhodamine B ($10^{-4}$M)

EXAMPLE VII (A) + ultra violet absorber: PPO ($10^{-3}$M)
fluorescent material: Rhodamine B ($2.10^{-5}$M) + uranin S ($10^{-5}$M)

Samples of formulation (A), i.e. containing no ultra-violet absorber or fluorescent material and samples of the mixture of Examples IV, V, VI and VII were tested in the following way:

Excitation: 160 lux for 2 minutes
Lamp: colour temperature 4200° K.

The table below summarises the levels of persistent emission obtained as a function of time, the values being expressed in candelas per $m^2$ ($Cd/m^2$).

| SAMPLE | Persistent Emission after excitation cut-off (cd/m$^2$) | | | | | | |
|---|---|---|---|---|---|---|---|
| | 15 min. | 30 min. | 45 min. | 1 hr. | 1½ hr | 2 hr | 2½ hr |
| Formulation A | 0.395 | 0.253 | 0.19 | 0.158 | 0.123 | 0.102 | 0.0917 |
| Example IV | 0.438 | 0.275 | 0.202 | 0.165 | 0.125 | 0.105 | 0.0933 |
| Example V | 0.417 | 0.257 | 0.194 | 0.159 | 0.121 | 0.102 | 0.0915 |
| Example VI | 0.401 | 0.253 | 0.191 | 0.156 | 0.120 | 0.101 | 0.0919 |
| Example VII | 0.404 | 0.27 | 0.201 | 0.165 | 0.123 | 0.104 | 0.0924 |

The table below summarises the increase in photoluminescence in comparison with conventional phosphorescent products (formulation A), expressed as percentages.

| % Difference | 15 min. | 30 min. | 45 min. | 1 hr | 1½ hr | 2 hr | 2½ hr |
|---|---|---|---|---|---|---|---|
| Example IV | 10.9 | 8.69 | 6.31 | 4.43 | 1.62 | 2.94 | 1.74 |
| Example V | 5.57 | 1.58 | 2.1 | 0.6 | −1.6 | 0 | −0.2 |
| Example VI | 1.52 | 0 | 0 | 0 | 0 | 0 | 0 |
| Example VII | 2.28 | 6.7 | 0.55 | 4.43 | 0 | 1.96 | 0.76 |

Except in the case of Example VI it will be seen that the increase is considerable, especially in the first minute following extinction (cessation of excitation). In this respect Example IV is quite remarkable since it still shows increased photoluminescence after 2½ hours. The photoluminescent products which form the subject of the present invention are, it should be remembered, chiefly safety materials which need to come into action particularly after illumination is extinguished so as to prevent persons involved from being caught unawares by sudden darkness.

It should be noted that the examples of materials containing anthracene (Examples I to III) similarly show a significant initial increase (cf. FIG. 4).

Depending upon the concentration of the fluorescent substances daytime colours from creamy white to yellow and orange may be obtained, whereas the colour of formulation A is greenish yellow.

Fluorescin itself has also been employed as a replacement for uranin S.

Another type of product, which also been produced for use as industrial floors in car-parks and for marking out carriage-ways.

The composition of this product is as follows, the proportions being by weight:

| | |
|---|---|
| Alloprene R$_{20}$ (a chlorinated rubber) | 35 |
| Xylene | 65 |
| PPO (ultraviolet absorber) | 0.22 (10$^{-3}$ M) |
| Rhodamine B (fluorescent material) | 4.79 10$^{-5}$ (10$^{-6}$ M) |
| Aerosil 200 | 0.5 |
| Cerechlor 42 | 17.5 |
| Methylethyl Ketone | 25 |
| Zinc sulphide | 40 |
| Glass spheres (crystalline fillers) | |
| Type C63.200 | 190.5 |
| Type 250.630 | 127 |
| | 500.5 |

Purely by way of indication examples of formulation of the chemical matrices previously referred to will now be given, the aforementioned ultra violet absorber and fluorescent material being incorporated in said matrices.

| "A" Elements | Parts by weight |
|---|---|
| A synthetic binder formed by | |
| An epoxy resin (araldite GY 250) | 74 |
| A hardening agent of an aromatic poly-aminoamide type -index 550 (Merginamide L, for example) | 37 |
| A plastifying agent (Mobil sol 44 for example) | 37 |
| Phosphorescent crystals | |
| such as ZnS | 20 |
| CaS | |
| CdS | |
| Zn$_2$SiO$_4$ | |
| SrS | |
| Colloid permeable to ultra-violet | |
| such as silica gel | 5 |
| Crystalline charges | |
| Aluminous silicate (Minex 4, for example) | 10 |
| Quartz 0.6–1.5 mm | 350 |
| Quartz type Sikron F 32 | 350 |
| Quartz powder B 3 | 120 |
| Quartz powder Sikron F 500 | 40 |

| "B" Elements | Parts by weight |
|---|---|
| Synthetic binder | |
| Polyurethane resin (type Desmodur 21 for example P.B.U.) | 110 |
| Plastifying agent of aromatic nature (type Shell sol A) | 20 |
| Ultra-violet dispersion agent (silica gel) | 5 |
| Phosphorescent crystals | 20 |
| Crystalline charges | |
| Washed pure quartz sand 0.2–1 mm | 1350 |
| Quartz powder φ 0.25 mm | 150 |
| Calcite (Durcal 40) - 43 microns | 100 |

| "C" Elements | Parts by weight |
|---|---|
| Synthetic binder | |
| 1. Polyester (type Desmophen 1150 of P.B.U.) | 290 |
| 2. Polyester (type Desmophen 550 U of P.B.U.) | 70 |
| 3. Polyurethane (type Desmodur V.L., P.B.U.) | 260 |
| Phosphorescent elements | |
| 1. Crystals ZnS | 56 |
| 2. Ultra-violet suspension agent | 4 |
| Crystalline charges | |
| 1. Calcite type Granicalcium 40 | 195 |
| 2. Quartz flour, W 6 | 130 |
| 3. Quartz flour W 2 | 615 |
| Plastifying agents | |
| 1. Diluent type L 2246 | 40 |
| 2. Zeolite L paste | 100 |

| "D" Elements | Parts by weight |
|---|---|
| Synthetic binder: | 100 |
| PVC (obtained by emulsion) | |
| Phosphorescent crystals | 20 |
| Crystalline charges | |
| Borosilicate glass (powder and granules) | 200 |
| Quartz powder | 100 |
| U.V. colloid agent, silica gel | 2 |
| Tricresyl phosphate | 40 |
| Chlorinated paraffin, 42% | 20 |

It may be observed that if the synthetic binding agent is not itself permeable to ultra-violet rays, it may be dissolved in an aromatic solvent, of the benzene series for example, having energy collection properties in an ultra-violet frequency band and re-emission in another higher band, the said solvent then corresponding to said first substances or alternatively containing the said substances.

In addition, still with the object of increasing the transparence of the material to ultra-violet and to improve the passage of light radiations, it may advantageously be contemplated, according to the invention, to incorporate in the material cellular substances (foam or sponge type) the vacuoles of which are centres of light convergence which make it possible to obtain materials with a cellular structure. At the same time as the said transparence is increased, the mechanical properties of the material are improved by virtue of the charges associated with the resin combined with the photo-luminescent pigment.

According to the present invention therefore, the following formulations may be proposed for the chemical matrices.

| "E" Elements | Parts by weight |
| --- | --- |
| Crystalline polyester resin (e.g. Daltolac 21) | 96 |
| Photo-luminescent crystals type ZnS | 10 |
| U.V. colloidal silica gel | 2 |
| Diphenyl-methane di-isocyanate (e.g. Suprasec D) | 100 |
| Borosilicate glass or quartz powder | 10 |
| Water | 3 |
| Wetting agent | 1 |

| "F" Elements | Parts by weight |
| --- | --- |
| Crystalline resin -unsaturated ester type Daltocel SF | 100 |
| Photoluminescent crystals type ZnS, CaS, SrS | 10 |
| Borosilicate glass or quartz powder or microballs | 10 |
| Colloidal U.V. agent type silica gel | 2 |
| Catalyst | 0.6 |
| Emulsifier | 1 |
| Water | 4 |
| Modifier | 0.5 |

| "G" Elements | Parts by weight |
| --- | --- |
| Epoxy resin (type Araldite 33.945) | 100 |
| Photo-luminescent crystals | 15 |
| Borosilicate glass or quartz powder or microballs | 10 |
| Colloidal U.V. agent type silica gel | 2 |
| Hardening agent | 73 |
| Frothing agent | 7 |
| Accelerator | 2.3 |

What we claim is:

1. Materials which are photoluminescent throughout, of the kind which include a synthetic binder whose spectral response extends from the near ultra-violet to the infrared and which has a maximum co-efficient of light transmission, crystalline fillers selected from the group consisting of ground quartz glass, ground quartz, and glass transparent to ultra-violet radiation, said crystalline fillers having a high light transmission within the same spectral range, further comprising in combination;
(a) 5 to 15% by weight relative to the synthetic binder plus crystalline fillers of at least one phosphorescent sulphide selected from the group consisting of zinc sulphide, cadmium sulphide, strontium sulphide and calcium sulphide,
(b) 0.1 to 1 molar percent relative to the synthetic binder of at least one substance which absorbs light energy in the ultraviolet region below 3900 Å and emits light energy within the absorption spectrum of the at least one phosphorescent sulphide, and
(c) 0.1 to 1% by weight relative to the at least one phosphorescent sulphide of one or more fluorescent substances which emit a persistant color which may be different from that emitted by the at least one phosphorescent sulphide.

2. Materials according to claim 1, in which the absorption spectrum of said fluorescent substance overlies the emission spectrum of the at least one phosphorescent sulphide.

3. Materials according to claim 1, in which the absorption spectrum of said fluorescent substance and the emission spectrum of the at least one phosphorescent sulphide are disconnected.

4. Materials according to claim 1 in which said fluorescent substance is an aromatic compound of the polycyclic hydrocarbon series.

5. Materials according to claim 4, in which the phosphorescent sulphide is zinc sulphide and the aromatic compound is pentacene.

6. Materials according to claim 4, in which the phosphorescent sulphide is zinc sulphide and the aromatic compound is hexacene.

7. Materials according to claim 1, in which the phosphorescent sulphide is zinc sulphide, and the substance which absorbs light in the ultra violet region below 3900 Å is anthracene.

8. Materials according to claim 7, in which the anthracene is partly replaced by naphthalene, the molar ratio of anthracene to naphthalene being of the order of $10^{-3}$ to $10^{-2}$: 1.

9. Materials according to claim 1, in which the fluorescent substance is at least in part replaced by an auxiliary phosphorescent substance.

10. Materials according to claim 9, in which the said auxiliary substance is cadmium sulphide and the essential phosphorescent sulphide is zinc sulphide.

11. Materials according to claim 1, in which the phosphorescent sulphide is zinc sulphide and the substance which absorbs in the ultra violet region below 3900 Å is diphenyloxazol.

12. Materials according to claim 11, in which the concentration of diphenyloxazol is $10^{-3}$ mole per kg of synthetic binder.

13. Materials according to claim 11, in which the fluorescent material is rhodamine B and/or uranin S.

14. Materials according to claim 13, in which the concentration of the fluorescent material is from $10^{-6}$ to $10^{-4}$ mole per kg. of synthetic binder.

15. Materials according to claim 11, which contains substantially 20% by weight of a synthetic binder consisting of a vinyl acetate-maleic ester co-polymer and 70% by weight of crystalline fillers.

16. A method of obtaining a material according to claim 1 which comprises:
(a) dispersing the at least one phosphorescent sulphide,
(b) dissolving the at least one substance which absorbs in the ultra violet region below 3900 Å and the fluorescent substance, in a suitable solvent, (c) mixing the crystalline fillers and the synthetic binder,
(d) introducing solution b into solution a and mixing until homogenised,
(e) adding the mixture obtained under c to that obtained under d.

17. A method according to claim 16, in which the at least one phosphorescent sulphide is zinc sulphide and the dispersion is effected in Tylose, in particular 3% Tylose 4000, preferably at a temperature of 30° to 40° C.

18. A method according to claim 16, in which the substance which absorbs in the ultra violet region below 3900 Å is anthracene alone or admixed with naphthalene and the fluorescent substance is pentacene, and solution is effected in 2-propanol, preferably at a temperature below 80° C.

* * * * *